UNITED STATES PATENT OFFICE.

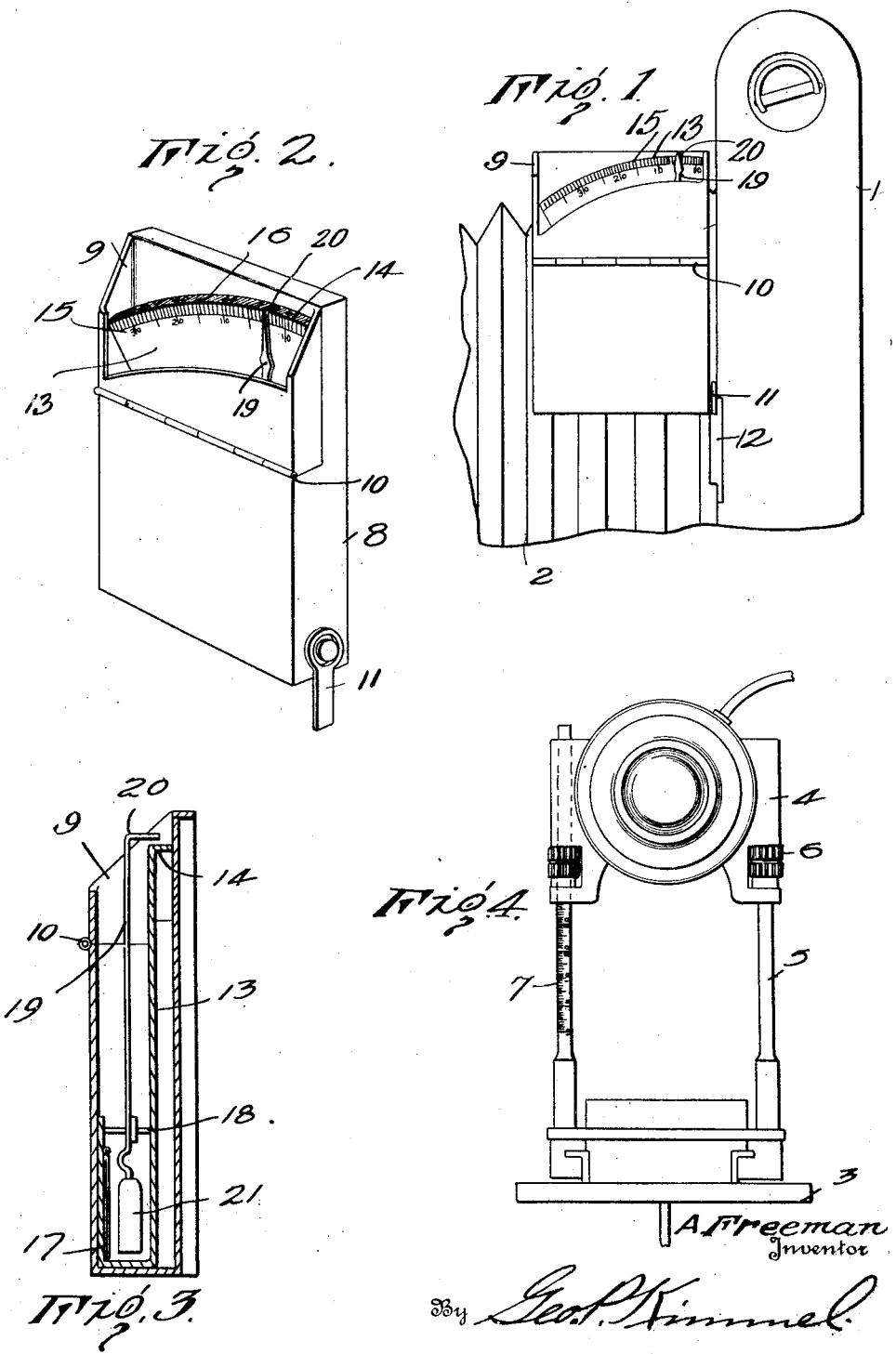

ALFRED FREEMAN, OF COLORADO SPRINGS, COLORADO.

OPTICAL-DIVERGENCE DETERMINER FOR CAMERAS.

1,263,223.  Specification of Letters Patent.  Patented Apr. 16, 1918.

Application filed April 10, 1917. Serial No. 161,005.

*To all whom it may concern:*

Be it known that I, ALFRED FREEMAN, a citizen of the United States, and resident of Colorado Springs, in the county of El Paso and State of Colorado, have invented certain new and useful Improvements in Optical-Divergence Determiners for Cameras, of which the following is a specification.

This invention relates to new and useful improvements in an optical divergence determiner attachment for cameras, preferably cameras employing a sensitized film, and the primary object of the invention is to provide a camera having a vertically adjustable lens with means whereby the degree of tilting or inclination of the finder of the camera relative to the horizontal may be automatically determined, and a coöperative scale on the movable lens so adjusted that the photographer may accurately determine the position to which the movable lens shall be moved in order to properly bring the object to be photographed upon the exposure surface of the camera without the necessity of replacing the sensitive film with a ground-glass plate or its equivalent.

Another object of the invention is to provide an optical divergence determiner, which is detachably and pivotally connected with the body of a camera, and which is adapted to swing either vertically or horizontally with respect to said camera according to the position of the same when the picture is taken.

Still another object of the invention is to provide a device of this character, which is easily and simply constructed, inexpensive to manufacture, and one which will be very efficient in operation.

With these and numerous other objects in view my invention consists of the novel features of construction, combination and arrangement of parts which will be herein referred to and more particularly pointed out in the specification and claims.

In the accompanying drawing:

Figure 1 is a detailed side elevation showing the attachment applied to the body of a camera;

Fig. 2 is a perspective view of the attachment;

Fig. 3 is a vertical transverse section through the attachment, and

Fig. 4 is a front elevation showing the vertically adjustable lens holding frame, and the coöperative scale that is associated therewith.

In describing my invention I shall refer to the drawing in which similar reference characters designate like and corresponding parts throughout the several views. In these drawings, I have shown the attachment applied to a camera of the bellows type, but it is obvious that the device is applicable to various types of cameras having vertically adjustable lenses, and which employ a sensitive film.

In the accompanying drawings the numeral 1 designates the body of a camera, having a bellows 2, and as shown in Fig. 4 of the drawings, a drop-front 3, lens frame 4, and vertical supports on which the frame 4 is movable. The upper ends of the supports 5 that are slidably connected with the lens frame 4 are threaded, and threaded thumb nuts 6 are adapted to coact therewith so as to vertically adjust the lens with respect to the camera. One of the supporting standards has a scale 7 formed thereon for a purpose to be hereinafter more fully described.

The automatically registrable reference scale attachment comprises a casing 8 which is rectangular shaped and is provided with an opened inclined top 9. This top 9 is hingedly connected so as to swing outwardly therefrom as shown at 10, so that access to the interior of the casing may be easily had. The casing 8 is provided at its one end, and adjacent the lower edge thereof with a pivoted foot 11, that is adapted to enter a socket member 12 secured to the front face of the body of the camera 1, adjacent the bellows 2. When positioned as clearly shown in Fig. 1 of the drawing, the casing 8 will be disposed vertically with respect to the camera.

Secured within the casing 8 is an upright plate 13, having an outwardly bent upper edge 14, and positioned on said upper edge, that is disposed adjacent the opening 9 in the top of said casing are arcuate scales 15 and 16, said scales being clearly shown in Fig. 2 of the drawings, and being arcuate owing to the fact that the upper edge of said plate is correspondingly curved. The opposite end of the plate 13 is bent as shown at 17 to form a pocket that is positioned on the bottom of the casing 8. Secured within the pocket is a horizontally extending pivot pin 18, upon which is mounted a normally vertically disposed index hand 19, having a laterally bent upper end 20, that is adapted to register with the scales 15 and 16 on the upper edge of the plate 13. The lower end of the index hand 19 has a weight 21 thereon, that will normally hold said index hand upright, in vertical position. The scales 15 and 16 of the casing 8 of the attachment correspond to the scale 7 on the vertical standards 5 of the lens adjusting device. The index hand 19 has its pointer end normally disposed over the point 0 on said scale, hence indicating that the camera is positioned horizontally, and upon movement of the camera in either direction, the angle or optical divergence with respect to the horizontal will be designated thereon.

In taking a picture at an acute angle, for instance of a large building, distortion occurs showing tipping and falling lines. As the acute angle increases the distortion is greater. The object of this attachment is to overcome this distortion, by giving the correct angle at which the lens should be adjusted with respect to the horizontal.

In the operation of this attachment, when the same is connected with a camera as clearly shown in Fig. 1 of the drawings, upon locating the objects accurately in the finder, it is obvious that the camera will be tilted from the horizontal, at an angle thereto. By the automatically registrable reference scale attachment, this angle will be accurately determined, so that when the said object is located centrally on the finder, the angle at which the camera is tilted may be determined at a glance. Owing to the fact that the scale 7 on the supporting standards 5 of the vertically adjusting lens mechanism corresponds to the scale on the attachment, upon determining the angle, it is only necessary to return the camera to normal horizontal position, and vertically adjust the lens holding frame to the corresponding angle noted on the scale 7, whereupon the optical divergence is overcome, and an accurate and correct picture may be taken from any angle.

This coöperative scale attachment for cameras affords easy and simple means for taking accurate photographs of large buildings, etc., without the employment of ground-glass plate, or like equivalent. The attachment that automatically registers the angle, may be applied to any type of camera, the attaching means illustrated in the accompanying drawings, being merely a preferred embodiment thereof. It is obvious that by this attachment, the automatically registrable reference scale may be positioned either vertically or horizontally with respect to the camera according to the position in which the same is held when the picture is taken.

In the accompanying drawings I have shown a conventional type of means for vertically adjusting the lens holding frame, but it will be understood that any desired adjusting means may be employed, that is, sufficient to move the lens relative to the camera, or angularly with respect to the horizontal. It is however necessary that said lens be provided with a scale corresponding to the scale on the automatically operable attachment, so that when the proper angle is determined, the lens may be vertically adjusted to correspond thereto, by comparison with the scale associated with said adjusting means.

From the foregoing description of the construction and operation of my new and improved optical divergence determiner attachment for cameras employing a sensitive film, the manner of applying the same to use, and the operation thereof will be readily understood, and it will be seen that I have provided a simple and efficient means for carrying out the objects of this invention.

Having fully described my invention, what I claim as new, and desire to secure by Letters Patent, is:

1. In a camera having a vertically adjustable lens with a scale associated therewith, a casing detachably connected with said camera and normally disposed vertically with respect thereto, said casing having a sight opening in the top thereof, an arcuate reference scale in the casing adjacent the sight opening, a vertically disposed index hand pivotally mounted within the casing and having its upper end coöperatively associated with the scale, and a weight on the lower end of said index hand to cause the upper end thereof to move across the scale upon movement of the camera.

2. In a camera having a vertically adjustable lens with a scale associated therewith, a casing carried by said camera having a sight opening in the top and front thereof, a pair of arcuate scales in the casing alining with said openings, a transversely extending pivot pin in said casing, an index hand mounted thereon with its upper end bent laterally and coöperatively related with said scale, and a weight on the lower end of said hand.

3. In a camera having a vertically adjustable lens with a scale associated therewith, a casing carried by said camera having sight openings in the top and front thereof, a plate in said casing disposed parallel with and adjacent the rear wall thereof, the upper end of said plate being curved arcuately and having a rearwardly projecting lip thereon, said upper end of the plate and projecting lip having reference scales thereon adapted for alinement with the sight opening in the front and top of the casing, a pocket formed on the lower end of said plate disposed in the bottom of the casing, a pivot pin carried thereby, an index hand mounted intermediate its ends on said pin, the upper end of said hand being coöperatively related with the scale on the upper end of the plate, the extremity of the said upper hand being bent laterally for coöperative relation with the scale on the lip of said plate, and a weight on the lower end of said hand within the pocket.

In testimony whereof, I affix my signature hereto.

ALFRED FREEMAN.

Copies of this patent may be obtained for five cents each, by addressing the "Commissioner of Patents, Washington, D. C."